United States Patent Office 2,776,988
Patented Jan. 8, 1957

2,776,988
ESTERS OF α-DICHLOROMETHYL BENZHYDROLS AND PROCESS

W E Craig and Elwood Y. Shropshire, Philadelphia, Pa., and Harold F. Wilson, Moorestown, N. J., assignors to Rohm & Haas Company, Philadelphia, Pa., a corporation of Delaware No Drawing. Application March 8, 1954,
Serial No. 414,902

14 Claims. (Cl. 260—487)

This invention relates to esters of α-dichloromethylbenzhydrols and acids of the formula R"COOH, where R" is hydrogen or lower alkyl or lower haloalkyl groups of not over three carbon atoms. It also concerns a method for preparing these esters, which have the structure

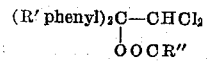

wherein R" has the above given meanings and R' is hydrogen, fluorine, chlorine, bromine, an alkyl group of not over four carbon atoms, or an alkoxy group of not over four carbon atoms.

The method comprises reacting an ethylenic compound

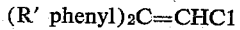

with positive chlorine and an acid R"COOH, preferably in an inert organic solvent, at reacting temperatures between about 0° and about 120° C. Solvents such as carbon tetrachloride, ethylene dichloride, benzene, toluene, xylene, naphtha, ethers, and the like may be used. If an ether such as ethyl ether or isopropyl ether is used, reaction temperatures should be kept relatively low, for example, below about 35° C. Dimethylformamide can also be used as a solvent if reaction temperatures are below 50° C. It is preferred that the reaction system be anhydrous, in which case in the presence of inert organic solvents boiling above 80° to 90° C. the reaction temperature may be in the higher range such as 90°–120° C. and the reaction completed relatively rapidly. Yet the system need not be anhydrous, for if water is present good results are obtained by working below 50° C., preferably 0° to 10° C., even though reaction is then slow.

While no catalyst is necessary, the presence of an acidic agent such as zinc chloride or acetate, copper acetate, or other soluble heavy metal salt accelerates the reaction and is desirably used when the reaction is not speeded up by raising the temperature.

The reaction mixture is worked up by suitable steps. If salts are present, as from use of a catalyst or other inorganic reagent, the mixture is filtered. If a water layer is present, it is taken off and the reaction mixture dried. It is then stripped of solvent and excess acid under reduced pressure. Heating may be carried to 180° C. at 20 mm. pressure, for example. In many cases the product can be crystallized, particularly with the aid of a volatile solvent such as petroleum ether. In some cases, as with butyrates and chlorocarboxylates the products have remained as oils.

As source of positive chlorine there is most advantageously used an organic hypohalite, such as butyl hypochlorite. This and other alkyl hypochlorites are prepared by reacting chlorine with a solution of an alkali or alkaline earth hydroxide in the presence of an alcohol, such as methyl, ethyl, propyl, butyl, or amyl alcohol. The alkyl hypochlorites are peculiarly effective reagents as they are readily taken up in the reaction mixture without introducing water or requiring the use of a heterogeneous system. Hypochlorite may be used in excess.

The ethylenic compounds which are used as starting materials are obtainable from compounds of the formula

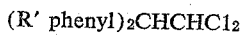

through dehydrohalogenating with a strong base in the presence of an alcohol. The above compounds are readily prepared, for example, by the method described in U. S. Patent No. 2,464,600. Useful compounds of this structure include the bis(4-chlorophenyl)-, bis(4-fluorophenyl)-, bis(4-bromophenyl)-, bis(dichlorophenyl)-, bis(methylchlorophenyl)-, ditolyl-, bis(ethylphenyl)-, bis(butylphenyl)-, bis(methoxyphenyl)-, etc., 2,2-dichloroethanes to yield the corresponding 1,1-bisphenyl-2-chlorethylenes. There may be used a single isomer or a mixture of isomers.

Dehydrohalogenation is conveniently accomplished by treating a bisphenyldichloroethane with sodium or potassium hydroxide in the presence of an alcohol, such as methyl, ethyl, propyl, or butyl alcohol, at 60° to 125° C. Excess alkali and salt formed are washed away with water and the ethylenic compound obtained upon stripping. Compounds of this type have previously been reported.

Typical preparations according to the process of this invention are presented in the following illustrative examples, wherein parts are by weight.

Example 1

To a cooled, stirred mixture of 575 parts of 1,1-bis(4-chlorophenyl)-2-chloroethylene, 300 parts of 98% formic acid, and 10 parts of copper powder there was added over a 1.5 hour period tert-butyl hypochlorite to a total of 217 parts. During this time the reaction mixture was maintained below 30° C. by cooling as needed. The mixture was stirred for 24 hours at about 30° C. It was then filtered and the filtrate was concentrated under reduced pressure to give an oil, which was triturated with petroleum ether. The treated oil formed crystals, which were recrystallized from nitromethane. The yield was 595 parts of α-dichloromethyl 4,4'-dichlorobenzhydryl formate. This compound melted at 105°–107° C.

In place of the above bis(chlorophenyl)chloroethylene there may be used other diphenylchloroethylenes having any of the above indicated phenyl substituents, including fluorine, bromine, lower alkyl, and alkoxy. Two or more of these substituents may be present in the same ring, as in 1,1-bis(methylchlorophenyl)-2-chloroethylene. The reaction proceeds in the same way and the products obtained are related in their action and utility.

Example 2

The procedure of Example 1 was followed with substitution of butyric acid for formic acid. The filtered reaction mixture was stripped under reduced pressure and heated to about 180° C. at 25 mm. pressure. The product obtained was an oil, which could not be crystallized. It corresponds in composition to α-dichloromethyl-4,4'-dichlorobenzhydryl butyrate. The yield was 74%.

Example 3

The procedure of Examples 1 and 2 was followed with substitution of chloroacetic acid for the previous acids. The reaction mixture was stripped at about 160° C. under reduced pressure to give an oil, which was distilled at 175°–183° C./0.3 mm. The resulting product, obtained in 62% yield, corresponds in composition to α-dichloromethyl-4,4'-dichlorobenzhydryl chloroacetate.

Example 4

A mixture of 57 parts of 1,1-bis(4-chlorophenyl)-2- chloroethylene, 49 parts of trichloroacetic acid, and 157 parts of tert-butyl alcohol was stirred while 25 parts of tert-butyl hypochlorite were added. The temperature rose to 37° C. during the addition. The reaction mixture was left standing for about 16 hours. The reaction mixture was heated under reduced pressure to remove volatile material. The residue was dissolved in benzene. The benzene solution was washed with water. The benzene layer was then subjected to distillation, benzene being removed to yield an oily residue, which on cooling and standing formed a glass. This was recrystallized from octane to yield a white solid melting at 113°–114.5° C. and corresponding by analysis to α-dichloromethyl-4,4'-dichlorobenzhydryl trichloroacetate.

By the same method 1,1-bis(ethylphenyl)-2-chloroethylene was reacted with formic acid and tert-butyl hypochlorite to yield α-dichloromethyl-4,4'-diethylbenzhydryl formate; 1,1-bis(4-methoxyphenyl)-2-chloroethylene was reacted with tert-butyl hypochlorite and acetic acid to form α-dichloromethyl-4,4'-bismethoxybenzhydryl acetate; and 1,1-bis(chlorophenyl)-2-chloroethylene was reacted with formic acid and tert-butyl hypochlorite to form α-dichloromethyl-4,4'-dichlorobenzhydryl formate. In place of butyl hypochlorite other alkyl hypochlorites can be used with like effect.

In place of these simple hypochlorites there may be used other sources of positive halogen. For example, 1,3-dichloro-5,5-dimethylhydantoin is an available and useful source of such halogen. There may similarly be used such compounds as tetrachlorobenzoguanimine, hexachloromelamine, trichloromelamine, azochloramide, dichloramine, chloramine, dichlorourea, dichlorodicyandiamide, etc.

Example 5

A mixture of 40 parts of 1,3-dichloro-5,5-dimethylhydantoin, 57 parts of 1,1-bis(4-chlorophenyl)-2-chloroethylene, and 210 parts of acetic acid was stirred for three hours. The mixture was treated with water and benzene. The benzene layer was washed with dilute sodium carbonate solution and with water. The benzene was distilled off. The residual oil was taken up in about 35 parts of isooctane and the product crystallized therefrom. It melted at 118.5°–120.5° C. The product was recrystallized from nitromethane. The thus purified product melted at 129°–131° C. By analysis this compound was α-dichloromethyl-4,4'-dichlorobenzhydryl acetate.

Other organic sources of positive chlorine may be used in the same way to give the desired esters.

Example 6

There were mixed 65 parts of 1,1-diphenyl-2-chloroethylene and 280 parts of glacial acetic acid. The 1,1-diphenyl-2-chloroethylene had been prepared by the method described above, starting with 1,1-diphenyl-2,2-dichloroethane, heating it with sodium hydroxide in the presence of methanol, washing away excess alkali and the salt formed during this reaction, and recovering the resulting 1,1-diphenyl-2-chloroethylene. The above mixture was warmed to effect solution of the 1,1-diphenyl-2-chloroethylene. To this solution was added with stirring over a one hour period 38 parts of tert-butyl hypochlorite. The temperature of the reacting mixture rose to 54° C. The reaction mixture was allowed to stand for 1.5 hours. The reaction mixture was then heated under reduced pressure and acetic acid was driven off. There was obtained as a residue an oily product. It was taken up in about 75 parts of isooctane and product was crystallized therefrom. A yield of 75.5 parts of a white solid was obtained. This quantity corresponds to 81.5% of theory. This material corresponds closely in composition with α-dichloromethylbenzhydryl acetate. The melting point of this compound is 102.5°–104° C.

When this compound was used as the sole toxicant against two spotted mites it gave a kill of adults of 66% at a dilution of 1:800 in a spray. It also acted as an ovicide.

The esters of this invention are interesting novel chemical substances which have the peculiar property of being acaricides. They have been applied to living plants infested with mites or spiders and found to be definitely effective in combatting these pests. Typical of the data obtained against two-spotted mites are the following, the first figure given being for the kill of adult mites and the second for the kill of eggs at dilution of 1:800: α-dichloromethyl-4,4'-dichlorobenzhydryl butyrate, 51% and 19%; α-dichloromethyl-4,4'-dichlorobenzhydryl trichloroacetate, 86% and 11%; α-dichloromethyl-4,4'-dichlorobenzhydryl chloroacetate, 58% and 23%; α-dichloromethyl-4,4'-dichlorobenzhydryl acetate, 92% and 15%; α-dichloromethyl-4,4'-diethylbenzhydryl formate, 89% and 15%, with the acetate thereof giving kills of 79% and 17%; α-dichloromethyl-4,4'-dichlorobenzhydryl formate, 100%; α-dichloromethyl-4,4'-bismethoxybenzhydryl acetate, 90% and 20%.

Field testing with α-dichloromethyl-4,4'-dichlorobenzhydryl formate demonstrated commercial control of European red mite and two-spotted mite on apple trees.

These compounds may be formulated with solid or liquid diluents or carriers. They may be used in the form of wettable powders, wherein wetting and dispersing agents are used along with clay, magnesium carbonate, silica, or other solid carrier. They may be extended with similar solid carriers to form dusts. They may also be dissolved in organic solvents along with oil-soluble emulsifiers to provide self-emulsifying concentrates. They may be used together with insecticides and/or fungicides.

We claim:

1. A process for preparing α-dichloromethylbenzhydryl esters of saturated, lower aliphatic monocarboxylic acids which comprises reacting by bringing together at a reacting temperature between 0° and 120° C. an ethylenic compound of the structure $$(R' \text{ phenyl})_2C=CHCl,$$

positive chlorine, and an acid R"COOH, R' being a member of the class consisting of hydrogen, fluorine, chlorine, bromine, alkyl groups of not over four carbon atoms, and the methoxy group, and R" being a member of the class consisting of hydrogen and alkyl and chloroalkyl groups of not over three carbon atoms.

2. A process for preparing esters of α-dichloromethylbenzhydrol and saturated, lower aliphatic monocarboxylic acids which comprises reacting by bringing together at a reacting temperature between 0° and 120° C. a compound of the structure $$(R' \text{ phenyl})_2C=CHCl,$$

an alkyl hypochlorite of not over five carbon atoms, and an acid R"COOH, R' being a member of the class consisting of hydrogen, fluorine, chlorine, bromine, alkyl groups of not over four carbon atoms, and the methoxy group, and R" being a member of the class consisting of hydrogen and alkyl and chloroalkyl groups of not over three carbon atoms.

3. The process of claim 2 wherein an inert organic solvent is present.

4. A process for preparing esters of α-dichloromethylbenzhydrol and saturated, lower aliphatic monocarboxylic acids which comprises reacting by bringing together at a reacting temperature from 90° to 120° C. in an anhydrous system a compound of the structure $$(R' \text{ phenyl})_2C=CHCl$$

an alkyl hypochlorite of not over five carbon atoms, and an acid R"COOH, R' being a member of the class consisting of hydrogen, fluorine, chlorine, bromine, alkyl groups of not over four carbon atoms, and the methoxy group, and R" being a member of the class consisting of hydrogen and alkyl and chloroalkyl groups of not over three carbon atoms.

5. A process according to claim 4, wherein the hypochlorite is tert-butyl hypochlorite.

6. A process for preparing α-dichloromethyl-4,4'-dichloromethylbenzhydryl formate which comprises reacting by bringing together at a reacting temperature between 0° and 120° C. 1,1-bis(chlorophenyl)-2-chloroethylene, tert-butyl hypochlorite, and formic acid.

7. A process for preparing α-dichloromethyl-4,4'-dichloromethylbenzhydryl acetate which comprises reacting by bringing together between 0° and 120° C. 1,1-bis(chlorophenyl)-2-chloroethylene, tert-butyl hypochlorite, and acetic acid.

8. A process for preparing α-dichloromethyl-4,4'-diethylbenzhydryl formate which comprises reacting by bringing together between 0° and 120° C. 1,1-bis(ethylphenyl)-2-chloroethylene, tert-butyl hypochlorite, and formic acid.

9. A process for preparing α-dichloromethyl-4,4'-dichlorobenzhydryl chloroacetate which comprises reacting by bringing together between 0° and 120° C. 1,1-bis(chlorophenyl)-2-chloroethylene, tert-butyl hypochlorite, and chloroacetic acid.

10. Compounds of the formula

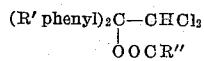

where R' is a member of the class consistitng of hydrogen, fluorine, chlorine, bromine, alkyl groups of not over four carbon atoms, and the methoxy group, and R'' is a member of the class consisting of hydrogen and alkyl and chloroalkyl groups of not over three carbon atoms.

11. A compound of the formula

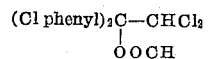

12. A compound of the formula

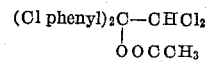

13. A compound of the formula

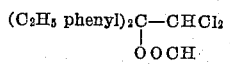

14. A compound of the formula

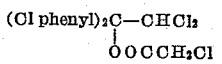

References Cited in the file of this patent
UNITED STATES PATENTS

| | | |
|---|---|---|
| 2,054,814 | Harford | Sept. 26, 1936 |
| 2,315,557 | Soday | Apr. 6, 1943 |
| 2,530,653 | de Benneville et al. | Nov. 21, 1950 |

OTHER REFERENCES

Chen et al.: J. Am. Chem. Soc. 72, 5124–5 (1950).
Pepper et al.: J. Am. Chem. Soc. 72 (1950), p. 1417.
March et al.: J. Entomol. 45 (1952), pgs. 851–3.